United States Patent [19]

Kleppner et al.

[11] Patent Number: 5,669,359

[45] Date of Patent: Sep. 23, 1997

[54] FUEL SUPPLY UNIT

[75] Inventors: Stephan Kleppner, Bretten; Kurt Frank, Schorndorf, both of Germany

[73] Assignee: Robert Bosch GmbH, Stuttgart, Germany

[21] Appl. No.: 645,481

[22] Filed: May 13, 1996

[30] Foreign Application Priority Data

Aug. 1, 1995 [DE] Germany .......................... 195 28 182.9

[51] Int. Cl.$^6$ ........................................... F02M 37/10
[52] U.S. Cl. ................................ 123/509; 137/574
[58] Field of Search ............................ 123/509, 514; 417/417; 137/574

[56] References Cited

U.S. PATENT DOCUMENTS

| | | | |
|---|---|---|---|
| 4,651,701 | 3/1987 | Weaver | 123/509 |
| 5,046,471 | 9/1991 | Schmid | 123/509 |
| 5,080,077 | 1/1992 | Sawert et al. | 123/509 |
| 5,454,697 | 10/1995 | Nakanishi | 123/509 |

FOREIGN PATENT DOCUMENTS 43 36 858 C1  1/1995  Germany .

*Primary Examiner*—Thomas N. Moulis
*Attorney, Agent, or Firm*—Michael J. Striker

[57] ABSTRACT

A fuel supply unit for mounting in a fuel supply container to supply fuel to an internal combustion engine has a tank flange arrangeable on the fuel supply container and provided with at least one hydraulic connection, a fuel supply aggregate arrangeable in the fuel supply container, a longitudinal and rotatably movable mechanical connection provided in the tank flange and the fuel supply aggregate, and a reservoir which receives the fuel supply aggregate, the movable connection being arranged on the tank flange and on the reservoir so that it receives the flow cap movable relative to the tank flange.

8 Claims, 1 Drawing Sheet

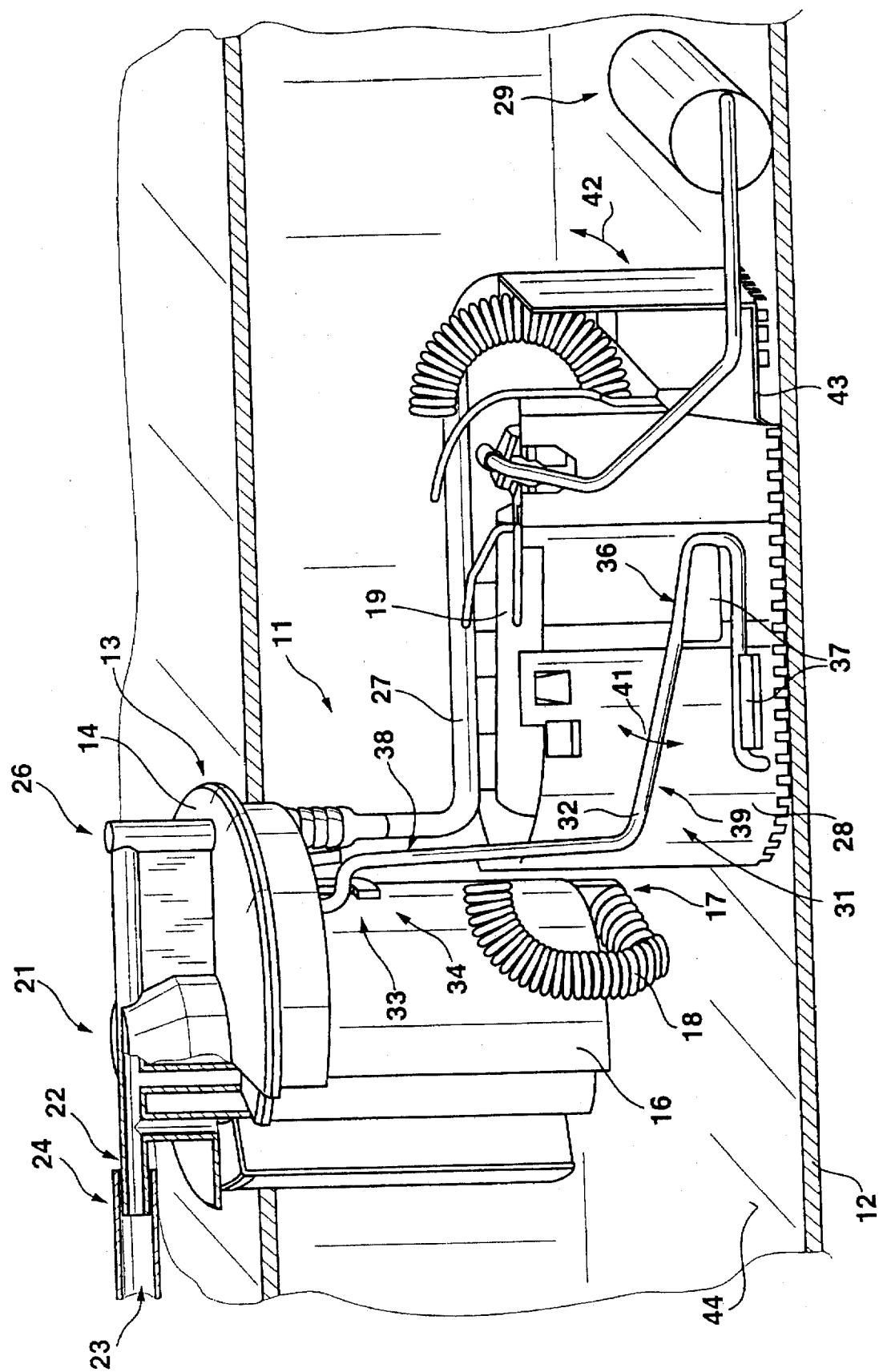

FUEL SUPPLY UNIT

BACKGROUND OF THE INVENTION

The present invention relates to a fuel supply unit to be incorporated in a fuel container, for supplying fuel to an internal combustion engine.

Fuel supply units of the above mentioned general type are known in the art. One of such units is disclosed for example in the German reference DE-C-43 36 858. Here the supply unit is provided with a filling level sensor and arranged in a fuel supply container, so that a holder which receives the fuel supply aggregate is longitudinally displaceable and rotatably movable on a tank flange. As a result, the lower end of the holder of the fuel supply aggregate can be centered turnably on a body of the fuel supply container or a reservoir. Angular deviations of the flange and/or the bottom of the fuel container from the nominal value do not therefore negatively act on the accuracy of the filling level sensor arranged on the fuel supply unit.

The mechanical connection can be formed on the one hand as a rubber elastic spring element. It has a plurality of substantially rectangular recesses, so that a longitudinally displaceable, turnable and springy element can be provided. This expensive spring element composed of synthetic plastic material can harden under the action of fuel, so that with increasing service time the longitudinally displaceable, rotatable and springy properties are reduced.

Alternatively, a mechanical connection is proposed in this reference and formed as a projection provided on a tank flange and having longitudinal grooves. Spherical projections formed on the holder of the fuel supply aggregate engage in longitudinal grooves and fix the holder turnably and longitudinally displaceably relatively to the projection of the tank flange. This design is expensive to manufacture because of the additional elements for forming a turnable and longitudinally displaceable mechanical connection. Also, the movement freedom of the longitudinally and rotatably movable mechanical connection is substantially limited in direction perpendicular to the longitudinal axis of the longitudinal groove.

SUMMARY OF THE INVENTION

Accordingly, it is an object of the present invention to provide a fuel supply unit which avoids the disadvantages of the prior art.

In keeping with these objects and with others which will become apparent hereinafter, one feature of the present invention resides, briefly stated, in a fuel supply unit, which is formed so that the mechanical connection which is fixedly arrangeable on the tank flange and on the reservoir receiving the fuel supply aggregate receives the flow cap movably relative to the tank flange.

When the fuel supply unit is designed in accordance with the present invention, a simple and inexpensive arrangement and construction of a mechanical connection between a tank flange and a reservoir which receives the fuel supply aggregate is provided. An angular deviation between a side wall receiving the flange and/or the bottom of the fuel supply container from the nominal value does not negatively affect the accuracy of the filling level sensor arranged on the fuel supply unit. The inventive mechanical connection provides for the possibility of correct positional mounting of the reservoir in the fuel supply container.

The fuel supply unit in accordance with the present invention can be formed as a completely premounted unit which is insertable into the fuel supply container, so that a fast mounting and a positionally correct arrangement in the fuel supply container is possible. Furthermore, due to the separate arrangement between the tank flange and the reservoir with the fuel supply aggregate arranged in it, it is also possible to use flatly integrated fuel containers.

Because of the fixed arrangement of the mechanical connection on the tank flange and the reservoir or because of the non-turnable or rotatable mounting on the tank flange and the reservoir, the receptacle for the mechanical connection can be formed in a simple manner on the tank flange and the reservoir. The portions of the mechanical connection located therebetween can receive the longitudinal displacement of the rotary movement of the reservoir to the tank flange.

Because of the inventive arrangement, the reservoir can be maintained independent from the tolerances and deformation of the fuel supply container always in a nominal built-in position. Simultaneously the fuel supply aggregate received in it also is always in a nominal built-in position.

In accordance with a further advantageous feature of the present invention, two spring elements are provided which are formed substantially identically. Thereby an inexpensive design of the spring element is provided, since with a single shape, a mechanical connection between the tank flange and the reservoir is possible.

In accordance with a further feature of the present invention, the spring elements are arranged symmetrically on the reservoir. Thereby the reservoir provides for a uniform abutment of the body of the reservoir against the body of the fuel supply container and the corresponding uniform force distribution, independently from tolerances and deformations of the fuel supply container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a perspective view of a fuel supply unit in accordance with the present invention.

DESCRIPTION OF THE PREFERRED EMBODIMENTS

A fuel supply unit identified with reference numeral 11 in FIG. 1. It is mounted in a fuel supply container 12 for supplying fuel to a not shown internal combustion engine. The fuel supply unit 11 is mountable as a completely premounted unit fast and position-accurate in the fuel supply container 12 by inserting in an opening 13 of the fuel supply container. The opening 13 is provided preferably on an upper side of the fuel supply container 12. The opening 13 is liquid-vapor-tightly closed by a tank flange 14. Preferably a seal is provided between the tank flange 14 and the opening 13.

The tank flange 14 has an inlet 17 on a fuel filter 16, and the fuel supply conduit 18 is connected with it. It is formed for example as a flexible hose. Fuel supply from a fuel supply aggregate 19 is fed through the fuel supply conduit 18 to the fuel filter 16. The fuel filter is arranged directly on a lower side of the tank flange 14 and extends into the interior of the fuel container 12. The fuel supplied through the fuel supply conduit 18 from the fuel supply aggregate 19 passes through the fuel filter 16. The fuel exits at the clean-side output of the fuel filter 16 and passes through a pressure regulator 21 which supplies the fuel to a connecting pipe 22. The connecting pipe 22 forms a hydraulic connection 23 with a further fuel supply conduit 24. The connection 23 leads to a not shown internal combustion engine and supplies the latter with fuel. The pressure regulator 21 has for example a return conduit 26 for returning from the supply aggregate 19 a quantity of fuel which is not needed for the internal combustion engine. The return conduit 26 leads to a fuel supply conduit 27. An end of the fuel supply conduit 27 can be arranged freely in the fuel container 12 or lead the return quantity of fuel to a reservoir 28.

The fuel supply conduit 19 is arranged in the reservoir 28 by not shown holding elements. The reservoir 28 receives preferably the fuel supply aggregate 19 in a vibration insulating manner with respect to the flow cap. A filling level sensor 29 is arranged on the reservoir 28. Due to the fixed arrangement of the fuel supply aggregate 19 as well as the filling level sensor 29 in the reservoir 28, always a definite manual position of both components 19, 29 in the reservoir 28 is guaranteed.

The reservoir 28 is held by a longitudinally and rotatably movable mechanical connection 31 relative to the tank flange 14 and at a distance from it. The mechanical connection 31 can be formed as a rod-shaped spring element 32 and it is possible to provide a mounting unit, with which a substantially definite distance is produced between the tank flange 14 and the reservoir 28.

The mechanical connection 31 has two spring elements 32 which fix the reservoir 28 to the tank flange 14. The spring elements 32 are advantageously identical so that they can be built in a front or rear position as shown in FIG. 1. It is further advantageous that the spring elements 32 are symmetrical relative to the longitudinal axis of the reservoir 28 and the longitudinal axis of the tank flange 14. The spring elements 32 can be composed of synthetic plastic material. When the spring element 32 is composed of metal, it can be formed as a wire steel bracket.

The spring element 32 has an end 33 facing the tank flange and having a S-shape. The free end 33 of the spring element 32 engages in an opening of the tank flange 14 and is fixed to the tank flange 14 by a mounting element 34. The mounting element 34 can be formed for example as a snapping hook, an arresting element and the like. The central portion of the S-shaped end 33 of the spring element 32 abuts against a back spring of the mounting element 34 and blocked in a longitudinal movement direction. The mounting element 34 is advantageously formed on the tank flange 14, so that the tank flange 14 can be produced as a simple and inexpensive injection molded element.

An end 36 of the spring element 32 which faces the flow cap is formed substantially U-shaped and fixed by two offset holders 37 to the reservoir 28. The holders 37 can be formed in a cross-section toward the outer wall of the reservoir 28 as substantially V-shaped receptacles. The free end 36 of the spring element 32 which faces the flow cap is arranged under prestress on the holder 37 which are formed for example on the reservoir 28.

A vertical portion 38 and a substantially horizontal portion 39 are formed between the ends 33 and 36 of the spring element 32. The size of the vertical portion is dependent substantially from the mounting height of the fuel container 12 and can have different lengths. The substantially horizontal portion 39 is adapted in its length to the size of the reservoir 28 or to the arrangement of the holders 37 on the reservoir 28. Advantageously, the substantially horizontal portion 39 extends at least to the half of the length of the reservoir 28, so that a reliable and fixed receipt of the reservoir 28 to the tank flange 14 can be provided.

During mounting the fuel supply unit 11 in a fuel container 12 the tolerances and deformations of the fuel container 12 must be compensated. A longitudinal movability and a height compensation are achieved when the substantially horizontal front portion 39 of the spring element 32 is movable up and down in the direction of the arrow 41. A rotation in direction of the arrow 42 can be provided in that an uneven deformation of the left and right spring element 32 in the portions 38 and 39 is possible. Simultaneously it can be however guaranteed that the spring element 32 transfers through the holder 37 a uniform holding force to the reservoir 28, so that a bottom 43 of the reservoir 28 abuts with a uniform force distribution against a bottom 44 of the fuel container 12. Thereby the angular deviation of the tank flange 14 and/or the bottom 44 of the fuel supply container 12 from the nominal position do not negatively act on the measuring accuracy of the filling level sensor 29 arranged on the fuel supply unit 11.

It is to be understood that the design of the substantially horizontal and vertical portions 38 and 39 of the spring element 32 can be different, so that they provide abutment of the reservoir 28 with application of at least a minimal force against the bottom 44 of the fuel container 12. Also, the end 33 of the spring element 32 at the side of the tank flange and the end 36 of the spring element 32 at the side of the reservoir can be arranged or mounted in accordance with another embodiment against the tank flange 14 and the reservoir 28. Basically, it is necessary to take care that these ends 33, 36 are not supported turnably or rotatably on the tank flange 14 or the reservoir 28.

It will be understood that each of the elements described above, or two or more together, may also find a useful application in other types of constructions differing from the types described above.

While the invention has been illustrated and described as embodied in a fuel supply unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel supply unit for mounting in a fuel supply container to supply fuel to an internal combustion engine, comprising a tank flange arrangeable on the fuel supply container and provided with at least one hydraulic connection; a fuel supply aggregate arrangeable in the fuel supply container; a longitudinal and rotatably movable mechanical connection provided in said tank flange and said fuel supply aggregate; and a reservoir which receives said fuel supply aggregate, said mechanical connection being arranged on said tank flange and on said flow cap so that it receives said reservoir movable relative to said tank flange, said mechanical connection being formed as a rod-shaped spring element having one end fixedly connected with said tank flange and another end fixedly connected with said reservoir, said rod-shaped element having a vertical portion and a horizontal portion which is movable relative to said vertical portion.

2. A fuel supply unit as defined in claim 1, wherein said spring element includes two spring members forming said mechanical connection and arranged substantially symmetrically on said flow cap.

3. A fuel supply unit as defined in claim 1, wherein said mechanical connection has at least two substantially identical spring elements.

4. A fuel supply unit as defined in claim 2, wherein said mechanical connection has a one end facing said tank flange and another end facing said reservoir, said spring element also having a substantially vertical portion and a substantially horizontal portion provided between said ends.

5. A fuel supply unit as defined in claim 2, wherein said tank flange is provided with a mounting element, said spring element having a substantially S-shaped end which faces said tank flange and is mounted on said mounting element.

6. A fuel supply unit as defined in claim 2, wherein said reservoir is provided with holders, said spring element has a substantially U-shaped end which faces said flow cap and is mountable on said holders.

7. A fuel supply unit as defined in claim 1, wherein said mechanical connection is composed of metal.

8. A fuel supply unit as defined in claim 1, wherein said mechanical connection is composed of synthetic plastic material.

* * * * *